(12) United States Patent
Toyoda (10) Patent No.: US 7,116,433 B1
(45) Date of Patent: Oct. 3, 2006

(54) IMAGE COMMUNICATION APPARATUS AND IMAGE COMMUNICATION METHOD

(75) Inventor: Kiyoshi Toyoda, Kunitachi (JP)

(73) Assignee: Panasonic Communications Co., Ltd., Fukuoka (JP)

(*) Notice: Subject to any disclaimer, the term of this patent is extended or adjusted under 35 U.S.C. 154(b) by 0 days.

(21) Appl. No.: 09/514,649

(22) Filed: Feb. 29, 2000

(30) Foreign Application Priority Data

Oct. 8, 1999 (JP) ................................. 11-287942

(51) Int. Cl.
G06F 15/00 (2006.01)
H04N 1/00 (2006.01)
H04M 11/00 (2006.01)

(52) U.S. Cl. ............... 358/1.15; 358/402; 358/405; 358/407; 358/434; 379/93.24; 379/100.08; 379/100.09

(58) Field of Classification Search ........... 379/93.24, 379/100.8, 100.08, 100.05, 100.04, 100.13, 379/100.09; 358/402, 405, 437, 444, 441, 358/439, 404, 407, 1.15; 345/752, 709; 709/206, 709/207

See application file for complete search history.

(56) References Cited

U.S. PATENT DOCUMENTS

| | | | | |
|---|---|---|---|---|
| 5,881,233 A | * | 3/1999 | Toyoda et al. .............. | 709/233 |
| 5,982,507 A | * | 11/1999 | Weiser et al. ............... | 358/438 |
| 6,018,801 A | * | 1/2000 | Palage et al. ............... | 713/201 |
| 6,020,980 A | * | 2/2000 | Freeman ..................... | 358/402 |
| 6,058,169 A | * | 5/2000 | Bramnick et al. ..... | 379/100.01 |
| 6,356,356 B1 | * | 3/2002 | Miller et al. ............... | 358/1.15 |
| 6,470,379 B1 | * | 10/2002 | Mori ......................... | 358/402 |
| 6,535,303 B1 | * | 3/2003 | Wolf .......................... | 358/434 |
| 6,665,086 B1 | * | 12/2003 | Hull et al. .................. | 358/1.15 |
| 6,700,674 B1 | * | 3/2004 | Otsuka et al. ............. | 358/1.15 |
| 6,717,688 B1 | * | 4/2004 | Ogawa ....................... | 358/1.15 |
| 6,801,340 B1 | * | 10/2004 | Endo .......................... | 358/403 |
| 6,801,546 B1 | * | 10/2004 | Yoshida et al. ............. | 370/490 |
| 6,952,279 B1 | * | 10/2005 | Iida ............................ | 358/1.15 |

\* cited by examiner

*Primary Examiner*—Douglas Q. Tran
*Assistant Examiner*—Chan S. Park
(74) *Attorney, Agent, or Firm*—Greenblum & Bernstein, P.L.C.

(57) ABSTRACT

IFAX is installed in securities firm A. PC is installed in a customer B and the other IFAX is installed in a branch C. IFAX transmits and receives image data between PC and IFAX via LAN and the Internet by use of e-mail. While, IFAX is connected to PSTN. IFAX transmits and receives facsimile data between G3FAX and IFAX via PSTN. IFAX transmits and receives image data among PC and the other IFAX and G3FAX and transmits the same image data to a host computer installed in a center in reduction in communication costs with respect to the center.

10 Claims, 8 Drawing Sheets

IMAGE COMMUNICATION APPARATUS AND IMAGE COMMUNICATION METHOD

BACKGROUND OF THE INVENTION

1. Field of the Invention

The present invention relates to an image communication apparatus for transmitting transmitted/received data to an information management center, and relates to an image communication method.

2. Description of the Related Art

By the revision of law made by Federal Securities and Exchange Commission in US, securities firms are obliged to have all data received by a facsimile apparatus browsed by a supervisor per reception and to store all copies. It is considered that a considerable amount of operations such as copying operation, filing operation, etc., occurs in order to abide by the law, and this causes troubles in day to day businesses.

In connection with such obligation, it is thought that data is received by the facsimile apparatus, thereafter, the same data is newly facsimile transmitted to a file server of an information management center for storing received data, document, etc. Also, it is thought that data is transmitted by the facsimile apparatus, thereafter, the same data is newly facsimile transmitted to the center. However, there is a problem in that such a facsimile transmission of the same data to the center after performing the facsimile transmission or reception causes an increase in communication costs.

SUMMARY OF THE INVENTION

It is an object of the present invention to provide an image communication apparatus and an image communication method capable of reducing communication costs to the center.

The present invention transmits image data transmitted and received to the center by e-mail on the Internet.

The transmission of image data to the center is carried out through the Internet, allowing the communication costs to be largely reduced.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

The following will specifically explain the embodiment of the present invention with reference to the drawings accompanying herewith.

Figure 1:
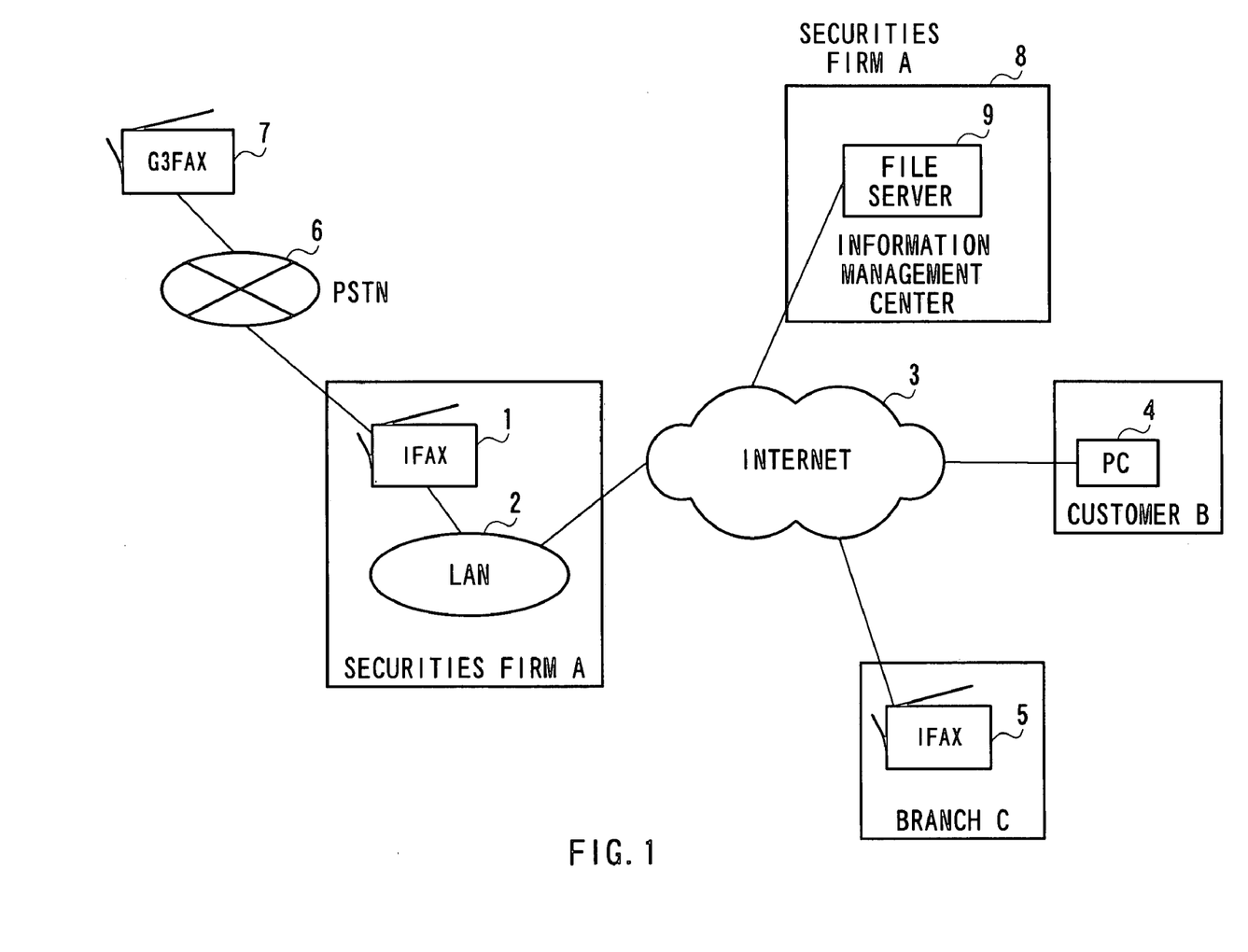
FIG. 1 is a conceptual view showing a network where an Internet facsimile apparatus operates according to an embodiment of the present invention.

FIG. 1 is a conceptual view showing a network where an Internet facsimile apparatus operates according to an embodiment of the present invention.

An Internet facsimile apparatus (hereinafter referred to as IFAX) 1 according to the above embodiment is installed in a securities firm A. This IFAX 1 is connected to LAN 2 installed in the securities firm A. This LAN 2 is connected to the Internet 3. Communication terminals such as PC 4 installed in a customer B and IFAX 5 installed in a branch office are connected to the Internet 3.

IFAX 1 transmits and receives image data between PC 4 and IFAX 5 by e-mail via LAN 2 and the Internet 3. While, IFAX 1 is connected to a public switched phone network (PSTN) 6. IFAX 1 transmits and receives facsimile data between G3FAX 7 and IFAX 1 via PSTN 6.

As mentioned above, IFAX 1 transmits and receives data such as image data among PC4, IFAX 5 and G3FAX 7. IFAX 1 transmits these data to a file server 9 provided in an information management center 8 via the Internet 3. Thereby, IFAX 1 transmits all communication contents to the file server 9 of the center 8. One or two or more of the center 8 are provided in order that the securities firm A stores replication of the content of communication carried out by IFAX provided in the securities firm A. The apparatus to be provided in the center 8 is not limited to file server 9, and IFAX, for example, may be provided therein. Also, the file server 9 may not be provided on the Internet 3. For example, the file server can be provided on the LAN 2 in the securities firm A.

The following will specifically explain IFAX 1 according to this embodiment.

Figure 2:
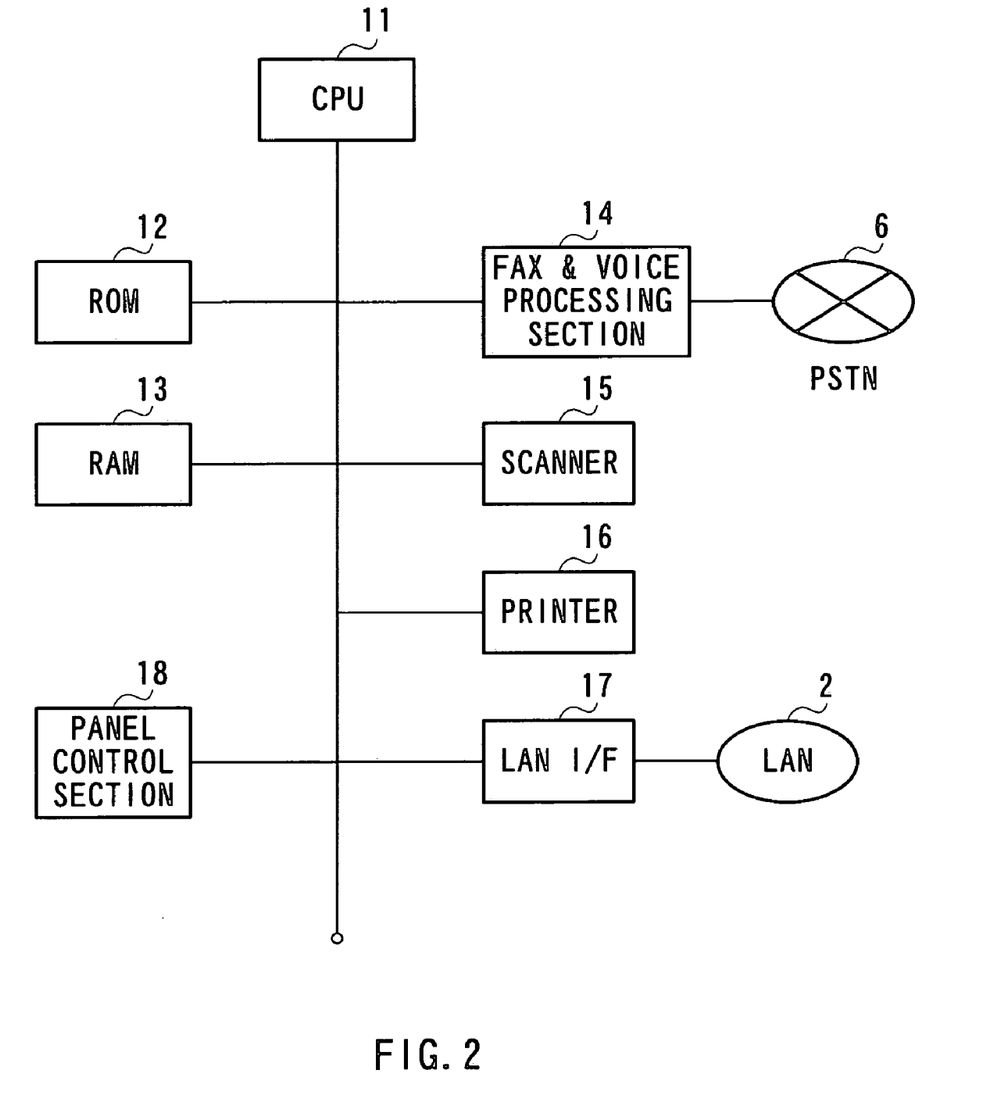
FIG. 2 is a block diagram showing hardware of the Internet facsimile apparatus according to the above embodiment.

FIG. 2 is a block diagram showing hardware of the IFAX according to the above embodiment. A CPU 11 executes a program, and controls the entirety of the apparatus. A ROM 12 stores the program executed by CPU 11.

A RAM 13 has a work area where the program is executed, and a buffer area where various kinds of data such as e-mail, image file, etc., are temporarily stored.

A FAX & voice processing section 14 modulates facsimile data and voice and outputs the modulated data to PSTN 6, and demodulates modulated data received from PSTN 6 to facsimile data and voice data.

A scanner 15 scans an original and obtains image data. A printer 16 prints various kinds of data including received image data.

A LAN interference 17 executes protocols necessary for transmitting and receiving data on LAN 2. Herein, the protocols used for transmitting and receiving data include, for example, a mail transfer protocol such as SMTP (Simple Mail Transfer Protocol) and a file transfer protocol such as HTTP, ETP.

A panel control section 18 comprises dial keys and touch panels, and receives operations to be done by an operator such as a specification of a communication partner, an instruction of transmission start, etc.

Figure 3:
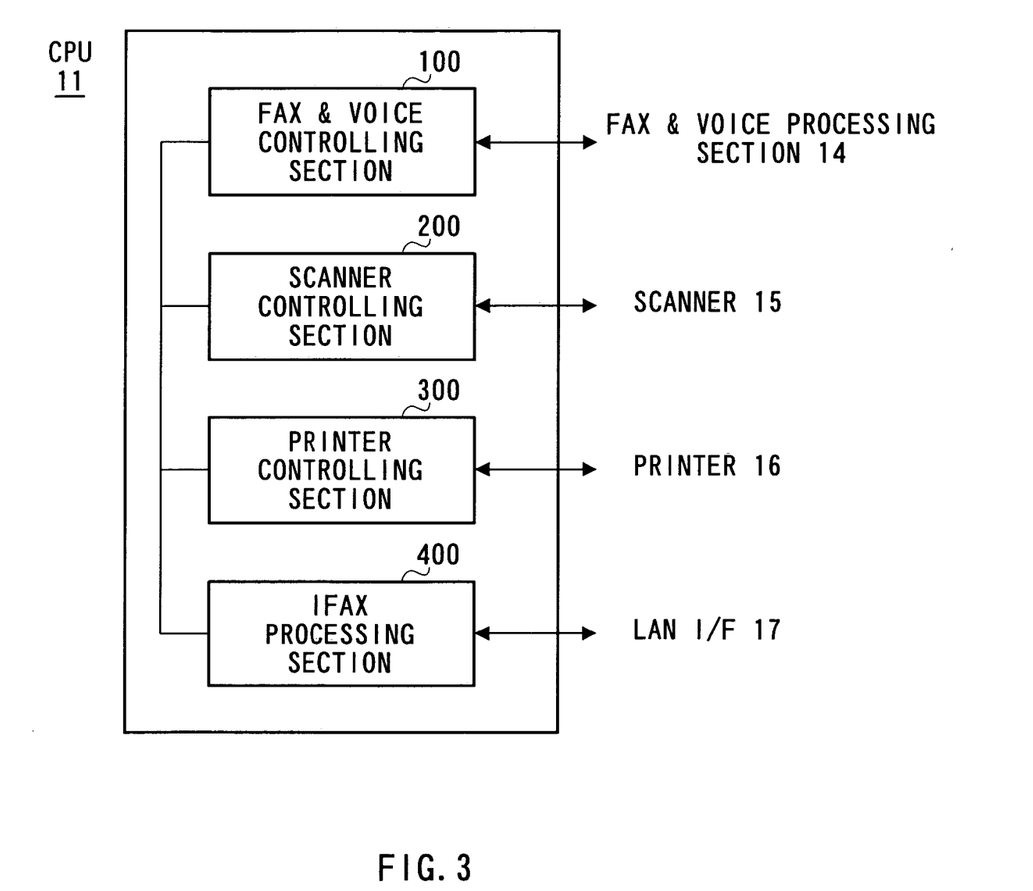
FIG. 3 is a block diagram showing functions of the Internet facsimile apparatus according to the above embodiment.

ROM 12 stores the program, and CPU 11 executes the program. An explanation of the functions to be resultantly implemented will be given as follows. FIG. 3 is a block diagram showing the functions of IFAX 1 according to the above embodiment.

IFAX 1 comprises a FAX & voice controlling section 100, a scanner controlling section 200, and a printer controlling section 300, and controls each of the FAX & voice processing section 14, scanner 15, and printer 16.

Also, IFAX 1 comprises an IFAX processing section 400 that implements the function as the so-called Internet facsimile apparatus (hereinafter referred to as IFAX). This IFAX processing section 400 transmits and receives e-mail via LAN 2 by use of LAN interface 17. In other words, e-mail is received from a sender, and the received data is printed by the printer 16. At this time, if an image file is appended to e-mail, the content of the image file is printed by the printer 16. While, IFAX processing section 400 converts the image data obtained by the scanner 15 to e-mail to be transmitted.

Figure 4:
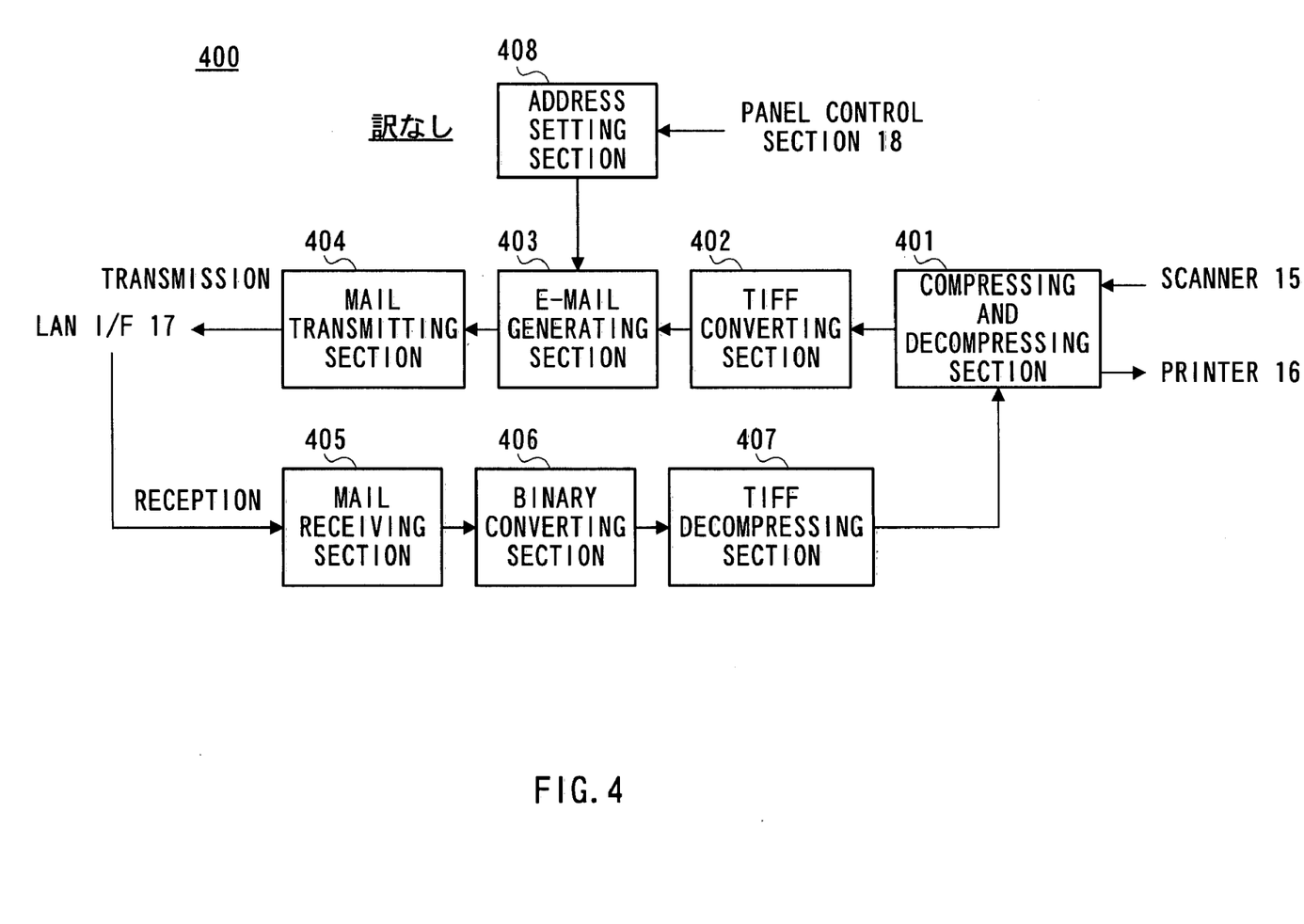
FIG. 4 is a functional block diagram showing an IFAX processing section of the Internet facsimile apparatus according to the above embodiment.

FIG. 4 is a functional block diagram showing the IFAX processing section 400 of the IFAX according to the above embodiment. The scanner controlling section 200 sends row image data (for example, bit map data) scanned by the scanner 16 to the IFAX processing section 400. In the IFAX processing section 400, a compressing and decompressing section 401 compresses row image data in a compression format such as MH, and obtains compressed files. The compression is carried out in unit of one page of original. A TIFF converting section 402 converts these compressed files to one TIFF (Tag Image File Format). An e-mail generating section 403 appends this TIFF file to a multi-part mail in accordance with, for example, MIME (Multipurpose Internet Mail Extension), and generates I-FAX mail.

A mail transmitting section 404 transmits the generated I-FAX mail to a mail server via LAN interface 17 in accordance with, for example, SMTP.

While, in the IFAX processing section 400, when a mail receiving section 405 receives the I-FAX mail via LAN interference 17, a binary converting section 406 converts the appended file included in the I-FAX mail from a text code to binary data and obtains the TIFF file. A TIFF decompressing section 407 decompresses the obtained TIFF file, and obtains compressed files. The compressing and decompressing section 401 decompresses these compressed files, and obtains row image data. The row image data is printed by the printer 16.

In the aforementioned IFAX processing section 400, a mail address input by the panel control section 18 is sent to an address setting section 408. The address setting section 408 sets this mail address to a destination address [To:] of I-FAX mail.

Also, the IFAX processing section 400 converts facsimile data received by the FAX & voice processing section 14 to e-mail. In other words, the compressed file received as facsimile data is converted to the TIFF file, and this TIFF file is appended to the multi-part mail, so that the IFAX mail is generated.

Figure 5:
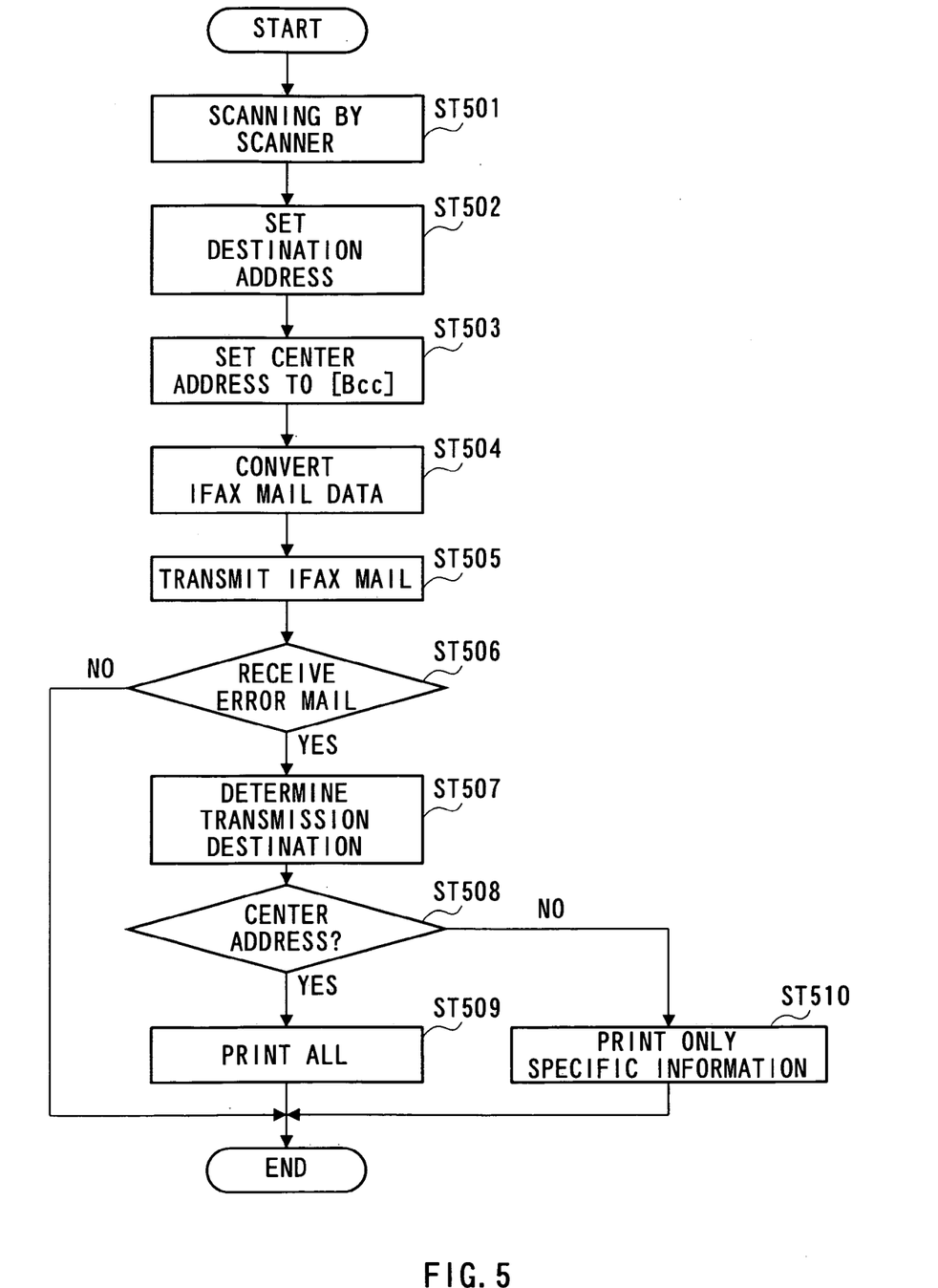
FIG. 5 is a flowchart showing steps of e-mail transmission processing in the Internet facsimile apparatus according to the above embodiment.

Next, an explanation is given of the processing, which is carried out when the I-FAX mail is transmitted in the above-configured IFAX 1. FIG. 5 is a flowchart showing steps of e-mail transmission processing in the IFAX 1 according to the above embodiment.

An operator places an original on a document glass, and inputs a mail address for a destination (hereinafter referred to as destination address) from the panel. Thereafter, when the operator depresses a transmission button, IFAX 1 scans the original (step (hereinafter referred to as ST) 501).

Next, the panel control section 18 sends the destination address input from the panel to the address setting section 408. The address setting section 408 sets the destination address to [To:] field of the header of I-FAX mail or [Cc:] field (ST502).

Next, the address setting section 408 sets a predetermined destination address to [Bcc:] field (ST503). This predetermined destination address denotes a mail address (hereinafter referred to as center address) of the file server 9 provided in the center 8. This center address is stored in RAM 13.

Thereafter, IFAX 1 converts image data scanned in ST501 to e-mail (ST504). In other words, IFAX 1 generates I-FAX mail to the address set by the address setting section 408.

I-FAX mail obtained in ST504 is transmitted by the mail transmitting section 404 (ST505).

When e-mail is received, IFAX 1 determines whether or not this e-mail is an error mail (ST506). If this e-mail is an error mail, IFAX 1 checks whether the error mail is one of e-mail to the file server 9 of the center 8 or one of the general e-mail. More specifically, a destination mail address of e-mail transmitted by IFAX 1, which is included in the error mail, is recognized (ST507).

It is checked whether or not the destination mail address identified in ST507 is the center address (ST508) Here, if the destination mail address identified is the center address, all contents of error mail are printed by the printer 16 (ST509).

While, if the destination mail address identified is not the center address, specific information is printed by the printer 16 (ST510). Here, the specific information is, for example, image data, which corresponds to the first page of the original, and an error message, which shows occurrence of an error.

Figure 6:
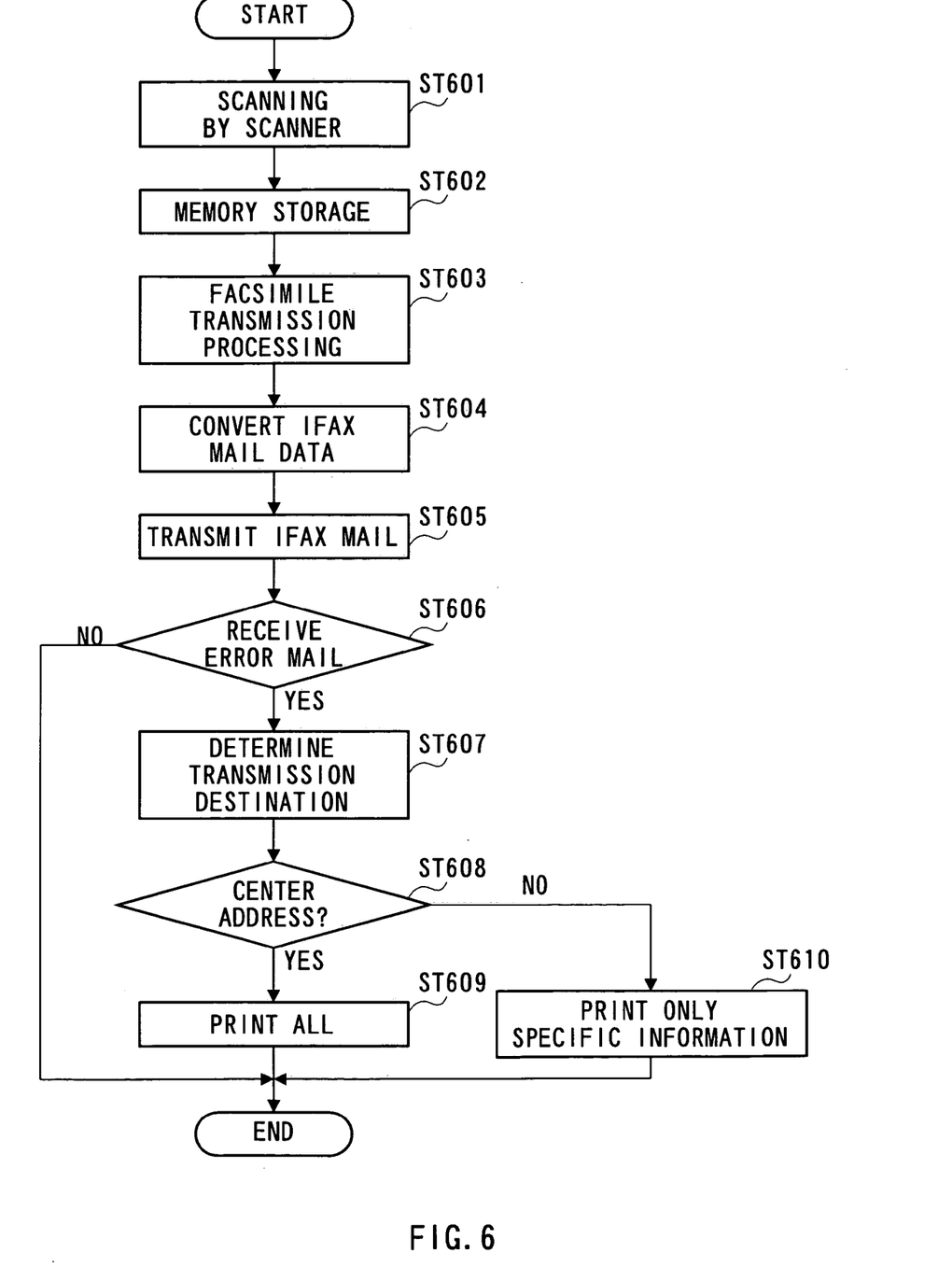
FIG. 6 is a flowchart showing stepss of facsimile transmission processing in the Internet facsimile apparatus according to the above embodiment.

Next, an explanation will be given of the processing, which is performed when facsimile data is transmitted in the above-configured IFAX 1. FIG. 6 is a flowchart showing steps of facsimile transmission processing in IFAX 1 according to the above embodiment.

An operator places an original on a document glass, and inputs a destination FAX number from the panel. Thereafter, when the operator depresses a transmission button, IFAX 1 scans the original (ST601). Raw image data (BMP data) obtained is stored in RAM 13 (ST602).

Next, the panel control section 18 sends the FAX number to the FAX & voice controlling section 100. The FAX & voice controlling section 100 facsimile transmits raw image data (bit map data) stored in RAM 13 to G3FAX of the FAX number input via PSTN 6 (ST603).

Figure 7:
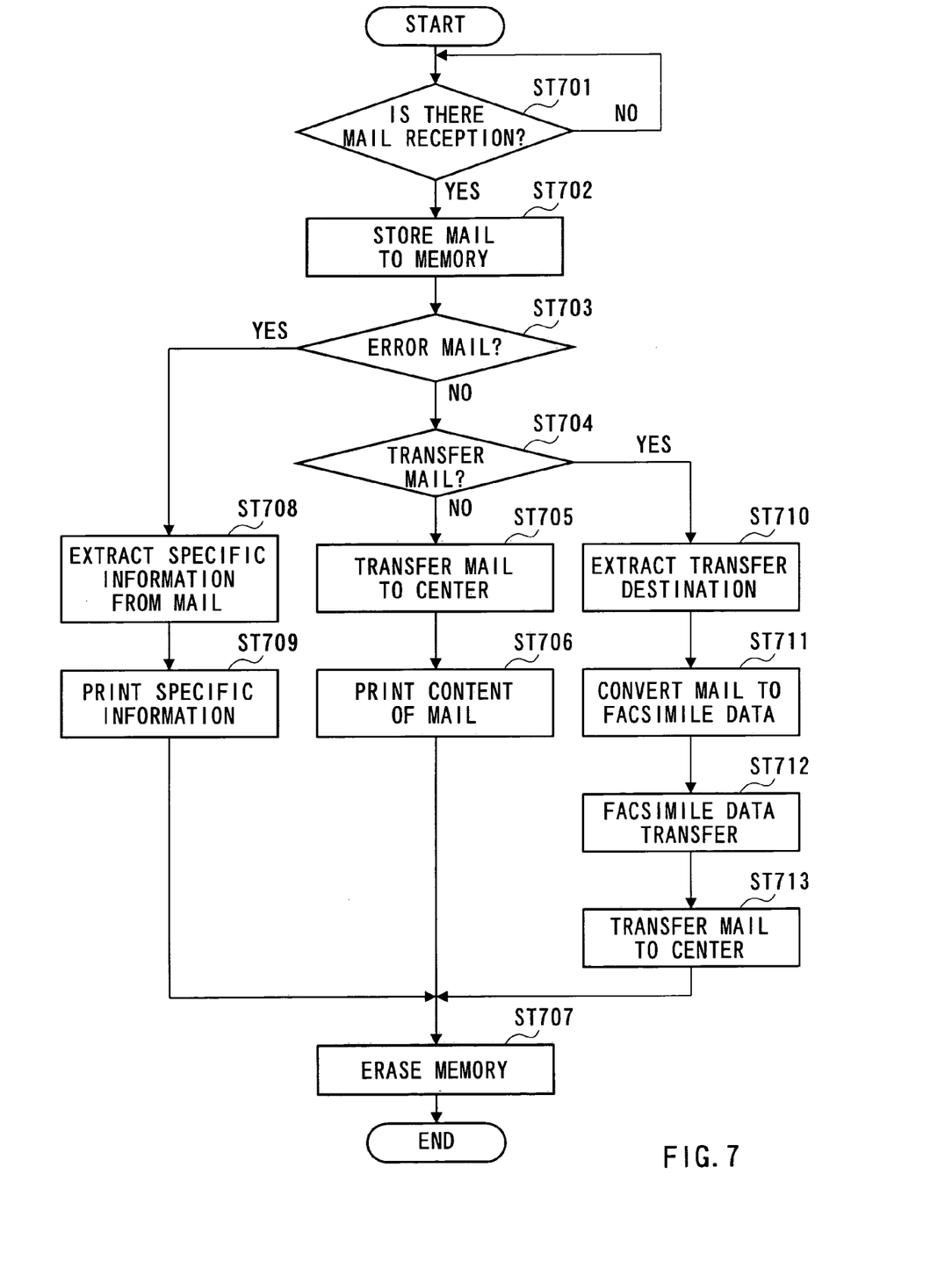
FIG. 7 is a flowchart showing stepss of e-mail reception processing in the Internet facsimile apparatus according to the above embodiment.

Next, the IFAX processing section 400 of IFAX 1 converts the raw image data stored in RAM 13 in ST602 to I-FAX mail (ST604). At this time, the address setting section 408 sets a predetermined address to [To:] field of the header of I-FAX mail. Then, IFAX 1 transmits this I-FAX mail to the mail transmitting section 404. The following will explain a case in which IFAX 1 according to the above embodiment receives e-mail. FIG. 7 is a flowchart showing steps of e-mail reception processing in IFAX according to the above embodiment.

If e-mail is received in ST701, the mail receiving section 405 of the IFAX processing section 400 of IFAX 1 stores received e-mail to RAM 13 (ST702).

Next, it is determined whether or not e-mail is an error mail (ST703). If e-mail is not an error mail, it is determined whether or not it is a transfer mail (ST704). The transfer mail is e-mail that requests IFAX 1 to transfer image data to the other facsimile apparatus. For example, if a password for relay is put in a mail address on the left from @, it is determined as a transfer mail. For example, in a case of PASSWD#123456@mgcs.co.jp, IFAX 1 transfers e-mail to FAX number 123456 using G3 FAX.

If e-mail is not a transfer mail, that is, e-mail is general e-mail, the IFAX processing section 400 transfers e-mail to the file server 9 of the center 8 (ST705). More specifically, the IFAX processing section 400 generates e-mail, which includes the received e-mail directly. The address setting section 408 sets a predetermined address (center address) to [To:] field of the header of this e-mail. This e-mail is transmitted by the mail transmitting section 404.

Next, the IFAX processing section 400 prints the content of the received e-mail (ST706). More specifically, if the received e-mail is an IFAX mail, image data included in TIFF file appended thereto is printed by the printer 16. At this time, a text portion of the IFAX mail is also printed by the printer 16. After the end of printing image data, etc., e-mail stored in RAM 13 is erased (ST707).

On the other hand, if received e-mail is an error mail in ST703, specific information is extracted from the error mail (ST708), and the extracted specific information is printed by the printer 16 (ST709). Thereafter, e-mail stored in RAM 13 is erased (ST707).

Also, if the received e-mail is a transfer mail in ST704, a transfer destination is extracted (ST710). Next, the IFAX processing section 400 converts e-mail to facsimile data (ST711). The FAX & voice control section 100 transmits the obtained facsimile data to the FAX & voice processing section 14 (ST712). Then, the IFAX processing section 400 transfers the received e-mail to the file server 9 of the center 8 in the same manner as that of ST705. Thereafter, e-mail stored in RAM 13 is erased (ST707).

Figure 8:
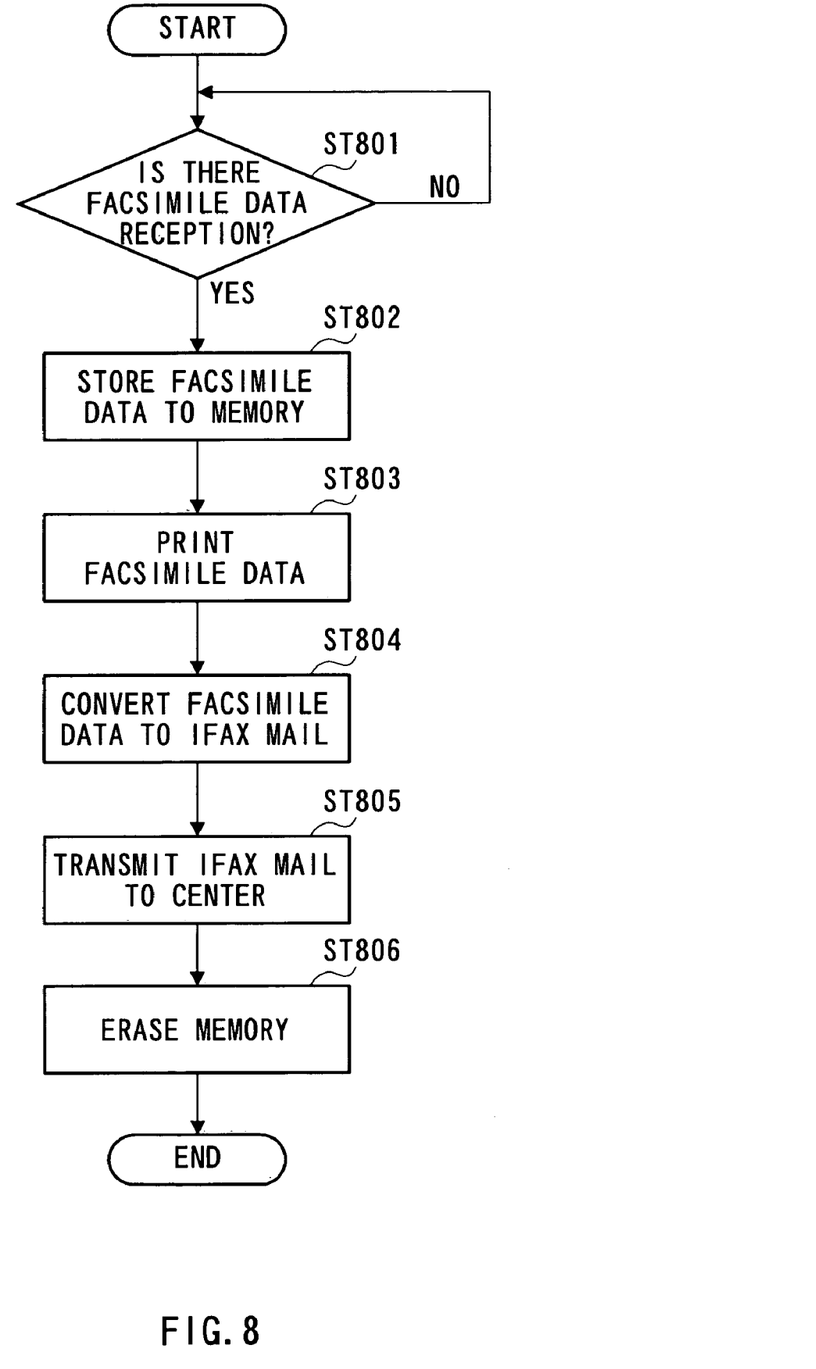
FIG. 8 is a flowchart showing stepss of facsimile reception processing in the Internet facsimile apparatus according to the above embodiment.

The following will explain a case in which IFAX 1 according to the above embodiment receives facsimile data. FIG. 8 is a flowchart showing steps of facsimile reception processing in IFAX according to the above embodiment.

If facsimile data is received in ST801, the FAX & voice controlling section 100 of IFAX 1 stores the received facsimile data to RAM 13 (ST802). Next, the printer controlling section 300 prints facsimile data using the printer 16 (ST803).

Next, the IFAX controlling section 400 converts facsimile data to IFAX mail (ST804). The address of this IFAX mail is set to the center address. The mail transmitting section of the IFAX processing section 400 transmits this IFAX mail to LAN (ST805). Thereafter, e-mail stored in RAM 13 is erased (ST806).

According to the above-configured IFAX 1, since IFAX 1 automatically duplicates all of the transmitted and received e-mail, IFAX mail, and facsimile data, and transmits them to the file server 9 of the center 8. There is no worry that the operator and manager must expend time and effort. Moreover, the transmission of data to the center 8 is carried out by IFAX mail, and this allows communication costs to be largely reduced.

Further, in the flowchart shown in FIG. 5, since the destination address is set to [To:] field and the center address is set to [Bcc:], the destination address is included in the header of the e-mail received by the receiver side but the center address is not included therein. This makes it possible to prevent the transmission of the duplication of e-mail to the center from being known by the receiver side.

Moreover, as in ST506 to ST510 of the flowchart shown in FIG. 5 and in ST606 to ST610 of the flowchart shown in FIG. 6, if IFAX 1 receives the error mail, which indicates that the transmitted e-mail has not been normally sent to the transmission destination, the transmission destination is determined from the error mail. Then, if the transmission destination is the center 8, all of the contents of the error mail are printed, and if the transmission destination is not the center 8, specific information is extracted from the error mail, and this specific information is printed. Whereby, in a case where the transfer of data to the center 8 fails for some reason, IFAX 1 prints all of the error mail and this printed material is stored, allowing obligation to store the duplication to be performed without fail. While, if the normal transmission of e-mail to the transmission destination fails, only the specific information is printed, making it possible to prevent all of the error mail from being printed so as to avoid waste of recording paper.

The present invention is not limited to the above-mentioned embodiment. For example, in the aforementioned embodiment, IFAX 1 is connected to Internet 3 via LAN 2, but the Internet connection method may be a dialup connection.

As explained above, according to the present invention, image data transmitted and received by the image communication apparatus provided in the securities firm, etc., is automatically transmitted to the center on the Internet by use of e-mail, and this makes it possible to easily transmit image data to the center and to largely reduce the communication costs required for the transmission of image data to the center.

The present invention is not limited to the above described embodiments, and various variations and modifications may be possible without departing from the scope of the present invention.

This application is based on the Japanese Patent Application No.HEI11-287942 filed on Oct. 8, 1999, entire content of which is expressly incorporated by reference herein.

What is claimed is:

1. An image communication apparatus comprising:
   a receiver configured to receive image data from a transmitting facsimile apparatus via a public switched phone network; and
   a controller configured to:
      convert the received image data to data for Internet transmission;
      attach the converted data to an e-mail; and
      transmit the e-mail to a management center, the management center configured to manage information that the image communication apparatus receives and further configured to connect to the image communication apparatus via the Internet,
   the controller being further configured to:
      determine whether a transmission destination is the management center based, on a received error mail, the received error mail indicating that the transmitting e-mail did not reach the transmission destination;
      print the received error mail when the transmission destination is the management center; and
      print a predetermined part of the received error mail when the transmission destination is not the management center.

2. An image communication apparatus comprising:
   a scanner configured to scan image data;
   a panel configured to input an address of a destination; and
   a controller configured to:

convert the received image data to data for Internet transmission;

attach the converted data to an e-mail; and transmit the e-mail to the destination and to a management center, the management center configured to manage information that the image communication apparatus transmits to the destination, and further configured to connect to the image communication apparatus via the Internet, the controller being further configured to:

determine whether a transmission destination is the management center based on a received error mail, the received error mail indicating that the transmitting e-mail did not reach the transmission destination;

print the received error mail when the transmission destination is the management center; and print a predetermined part of the received error mail when the transmission destination is not the management center.

3. The image communication apparatus according to claim 2, wherein the management center stores the information that the image communication apparatus transmits to the destination, the information being browsed by a supervisor of the management center.

4. The image communication apparatus according to claim 2, wherein the controller sets the address of the destination in a "To" field of the e-mail and sets a mail address of the management center in a "Bcc" field of the e-mail.

5. An image communication apparatus comprising:

a facsimile transmitter configured to transmit image data to a destination based on a facsimile protocol;

an e-mail transmitter configured to:

convert the image data to data for Internet transmission;

attach the converted data to an e-mail; and transmit the e-mail to a management center, the management center configured to manage image data that is transmitted by the facsimile transmitter, and further configured to connect to the image communication apparatus via the Internet; and a controller configured to:

determine whether the transmission destination is the management center, based on a received error mail, the received error mail indicating that the transmitting e-mail did not reach a transmission destination;

print the received error mail when the transmission destination is the management center; and print a predetermined part of the received error mail when the transmission destination is not the management center.

6. The image communication apparatus according to claim 5, wherein the management center stores the image data that is transmitted by the facsimile transmitter, the image data being browsed by a supervisor of the management center.

7. The image communication apparatus according to claim 5, wherein the e-mail transmitter sets an e-mail address of the management center in a "To" field of the e-mail.

8. An image communication method comprising:

receiving image data from a transmitting facsimile apparatus via a public switched phone network;

converting the received image data to data for Internet transmission;

attaching the converted data to an e-mail;

transmitting the e-mail to a management center, the management center managing information that the image communication apparatus receives and further connecting to the image communication apparatus via the Internet;

determining whether a transmission destination is the management center based, on a received error mail, the received error mail indicating that the transmitting e-mail did not reach the transmission destination;

printing the received error mail when the transmission destination is the management center; and printing a predetermined part of the received error mail when the transmission destination is not the management center.

9. An image communication method comprising:

scanning image data;

inputting an address of a destination;

converting the received image data to data for Internet transmission;

attaching the converted data to an e-mail;

transmitting the e-mail to the destination and to a management center, the management center managing information that the image communication apparatus transmits to the destination, and further connecting to the image communication apparatus via the Internet;

determining whether a transmission destination is the management center based on a received error mail, the received error mail indicating that the transmitting e-mail did not reach the transmission destination;

printing the received error mail when the transmission destination is the management center; and printing a predetermined part of the received error mail when the transmission destination is not the management center.

10. An image communication method comprising:

transmitting image data to a destination based on a facsimile protocol;

converting the image data to data for Internet transmission;

attaching the converted data to an e-mail;

transmitting the e-mail to a management center, the management center managing image data that is transmitted by the facsimile transmitter, and further connecting to the image communication apparatus via the Internet;

determining whether the transmission destination is the management center, based on a received error mail, the received error mail indicating that the transmitting e-mail did not reach a transmission destination;

printing the received error mail when the transmission destination is the management center; and printing a predetermined part of the received error mail when the transmission destination is not the management center.

* * * * *